United States Patent [19]

Fukuoka

[11] Patent Number: 4,542,058
[45] Date of Patent: Sep. 17, 1985

[54] FREEZE-THAW STABLE STONEWARE TILE AND PROCESS FOR PRODUCTION THEREOF

[76] Inventor: Shigetaka Fukuoka, No. 1745-2, Mita, Ueno-shi, Mie, Japan

[21] Appl. No.: 565,692

[22] Filed: Dec. 27, 1983

[51] Int. Cl.$^4$ .............................................. B32B 3/10
[52] U.S. Cl. .................................... 428/134; 264/43; 264/44; 428/332
[58] Field of Search .................. 428/49, 310.5, 312.6, 428/312.8, 131, 134, 136, 312.2, 332; 264/42–44

[56] References Cited

U.S. PATENT DOCUMENTS

| | | | |
|---|---|---|---|
| 2,227,770 | 1/1941 | Ungewiss | 428/312.6 |
| 3,132,956 | 5/1964 | Lewis | 428/312.6 |
| 3,439,450 | 4/1969 | Richards | 428/332 |
| 3,959,541 | 5/1976 | King et al. | 428/312.6 |
| 4,184,885 | 1/1980 | Pasco et al. | 428/312.6 |

*Primary Examiner*—William J. Van Balen
*Attorney, Agent, or Firm*—Browdy and Neimark

[57] ABSTRACT

Freeze-thaw stable stoneware tile is provided, which possesses in its tile body a multiplicity of pores having a pore diameter of 0.6 micron or more and exhibiting no substantial capillary action and a multiplicity of continuous micropores having a pore diameter of 0.3 micron or less and exhibiting substantial capillary action. The relatively coarse pores are communicated with the micropores, and the micropores are communicated with the outside of the tile body. The tile is produced by compressing a mixture of a mineral flux material having a specific particle range and a plastic mineral material into a molded article having a packing rate of 0.68 or more, and then baking the molded article to a temperature at which the mineral flux material fuses.

19 Claims, 2 Drawing Figures

FREEZE-THAW STABLE STONEWARE TILE AND PROCESS FOR PRODUCTION THEREOF

BACKGROUND OF THE INVENTION

The present invention relates to freeze-thaw stable stoneware tile having water absorption of not more than about 10%, and to a process for production thereof.

In order to prevent tiles such as indoor tile from freeze-thaw damage, hitherto there has been used a porcelain body for the tile having water absorption of less than 0.5% or 1%, or employed water-repellent treatment on a tile body having higher water absorption. Production of the porcelain tile requires a firing temperature higher than the case of the stoneware tile. As a result, deformation of the resulting tile bodies and some unevenness on glazed tile surfaces have resulted from the softening of the tile bodies due to such high firing temperature. Also, porcelain tile can not be fired in such a fashion that a multiplicity of tile bodies are arranged vertically in saggers (i.e. firing vessels). Moreover, a larger amount of fuel or electric power is needed for production of such porcelain tile bodies. On the other hand, the water-repellent treatment requires an additional apparatus therefor. There is also a problem of the durability of such water-repellent effects.

SUMMARY OF THE INVENTION

Intensive research on stoneware tile bodies having water absorption of about 0.5% to about 10%. The stoneware tile bodies can be produced at relatively low cost because there is employed a lower firing temperature and raw materials of relatively crude or poor grade, in comparison with the porcelain tile bodies, can be used in making these less expensive stoneware tiles. Conventional stoneware tile bodies, however, can not withstand the freeze and thaw conditions which are often encountered in winter, because of their high water absorption properties. It now has been unexpectedly found that such freeze-thaw damage can be prevented by incorporating a multiplicity of relatively coarse pores in stoneware tile bodies, the pores of which are communicated with continuous micropores present in the tile bodies. It is considered that the relatively coarse pores incorporated in the stoneware tile bodies serve successfully for buffer action when water absorbed by capillarity in the continuous micropores freezes and expands its volumes. The present invention, however, should not be bound by such theory.

An object of the present invention is to provide freeze-thaw stable stoneware tile and a process for production thereof. Another object of the present invention is to produce the above mentioned tile by firing at a relatively low temperature and, if necessary, using a relatively efficient firing apparatus, in comparison with the case of the conventional freeze-thaw stable porcelain tile. Other objects and features of the present invention will become apparent from the following description.

In accordance with the present invention, there is thus provided freeze-thaw stable stoneware tile which includes in its stoneware tile body having water absorption of about 0.5 to about 10%, a multiplicity of relatively coarse pores having a pore diameter of not less than about 0.6 micron and a multiplicity of continuous micropores having a pore diameter of not more than about 0.3 micron, said relatively coarse pores being communicated with the continuous micropores, and said micropores being communicated with the outside of the tile body.

There is also provided a process for production of the above mentioned freeze-thaw stable stoneware tile, which comprises the steps of compressing a raw stoneware material consisting essentially of (i) a plastic mineral material such as talc or steatite, pottery stone and/or clay and (ii) a mineral flux material having a mean particle size of not less than about 1 micron such as feldspar, sericite, lime or limestone and/or petalite into a molded article having a mean packing rate of not less than 0.68, and then baking a molded article to a temperature at which the flux material included in the molded article fuses; whereby the above mentioned continuous micropores are formed and the raw stoneware material is substantially bonded together, and then the flux material is fused to form the above mentioned relatively coarse pores.

DETAILED DESCRIPTION OF THE INVENTION

Figure 1:
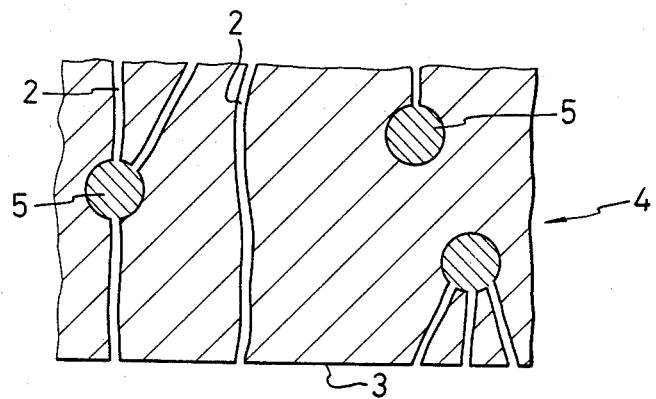
FIG. 1 is a schematic cross-sectional partial view of an intermediately-fired tile body wherein the continuous micropores were formed by the molding and/or baking but the flux material is not fused yet, in accordance with the present invention.

The term "stoneware" used herein means ceramics composed of mineral materials bonded together by firing to a moderately high temperature, which has water absorption of 0.5 to 10% and preferably about 1 to about 9%. Thus, the "stoneware" herein includes the so-called stoneware and may also include some semivitreous earthenware or chinaware and some near-vitreous porcelain, although the definitions thereof may differ in countries. The term "stoneware tile" herein means a flat or curved ceramic piece of the above defined stoneware used generally for walls and/or floors, sometimes for roofs.

The raw stoneware material to be used in the present invention consists essentially of (i) a plastic mineral material such as talc and (ii) a mineral flux material such as feldspar. The mean particle size of the flux material is in the range of about 1 to about 80 microns, and that of the plastic mineral material is about 0.3 to about 80 microns. The ratio by weight of the plastic mineral material to the flux material contained in the raw stoneware material is generally in the range of about 25/75 to about 95/5. It is generally preferred that the raw stoneware material contains clay. Incidentally, sericite can serve as both the flux material and plastic material, if it is used in the raw stoneware material.

It is of importance that the particle size of the flux material is substantially in the above defined range. If the particle size is above about 80 microns, the resulting stoneware body has too large pores which will deteriorate the quality thereof. When the particle size of the flux material is substantially smaller than about 1 micron, such small flux material particles may form small pores of the corresponding size which will exhibit undesired capillarity, and may also result in clogging of the continuous micropores. Thus, it is preferable or sometimes necessary to classify the ground particles of the flux material to be substantially within the above defined particle size range.

The raw stoneware material is compressed at about 260 kgf/cm$^2$ or more to a mean molded packing rate of not less than 0.68 and preferably not less than 0.7 when it is molded into a tile-shaped article. The term "molded packing rate" herein means one (1) minus void content of the molded article. If the packing rate is less than 0.68, the aimed freeze-thaw stable stoneware tile can hardly be obtained. The upper limit of the packing rate will be about 0.8 according to normal compression. Incidentally, use of talc or steatite is especially preferred in order to readily obtain the packing rate.

The resulting molded article is heated to a stoneware-forming temperature and then to a temperature at which the flux material is fused (e.g. about 1100° to about 1200° C.) to form the relatively coarse pores. Such firing operations can be carried out in a kiln, furnace or oven either successively or in two steps. In the two-step operations, the molded articles are fired at a preliminary (or unglazed) baking temperature (e.g. about 900° C. or higher) for a sufficient period of time (e.g. 40 hours in a tunnel kiln or 1 hour in a R. H. kiln), glaze is applied thereon as necessary, and then the baked articles are again fired at a higher baking temperature (e.g. about 1100° to 1200° C.) for a sufficient period (e.g. 20 hours in a tunnel kiln or at least 0.5 hour in a R. H. kiln). Incidentally, the stoneware tile of the present invention can be fired efficiently in such a fashion that a plurality of the molded articles are arranged vertically in firing vessels.

There is thus obtained freeze-thaw stable stoneware tile having water absorption of about 0.5 to about 10% in accordance with the present invention. When the stoneware body has water absorption of about 1 to about 9%, the freeze-thaw stability is more markedly exhibited. Incidentally, the term "water absorption" means that of the tile body when soaked in water for 24 hours. A mean pore diameter of the coarse pores in the present stoneware tile is in the range of about 0.6 to about 100 microns and preferably about 1 to about 30 microns, so that they exhibit no capillarity. That of the continuous micropores is in the range of about 0.01 to about 0.3 micron and preferably about 0.05 to about 0.2 micron, so that they exhibit substantial capillarity. It is also noted that the present freeze-thaw stable stoneware tile has the coefficient of water saturation of not more than about 0.7. In this connection, it is known in the art that the ceramic ware having the coefficient of about 0.7 or less exhibits some freeze-thaw stability. Incidentally, the coefficient of water saturation herein is defined by water absorption of an article when soaked in water for 24 hours divided by water absorption of the article degassed at 50 mm Hg or less when soaked in water for 24 hours.

The present invention is now explained with reference to the drawings. It should be noted, however, that FIGS. 1 and 2 are schematic cross-sectional partial views under magnification, and that actually there exist numerous continuous micropores and relatively coarse pores in the tile bodies although several micropores and coarse pores are shown in FIG. 2.

The plastic mineral material such as raw talc is excellent in orientation of particles and plasticity, and gives molded articles having a high packing rate with very low molding pressure. Also, it serves to form micropores 2 communicated with the outsides of the fired tile bodies 1, 4. Clay used as the plastic mineral material is excellent in plasticity, and serves to enhance the packing rate and formation of the micropores 2. The mineral flux material such as feldspar is fused and converted to vitrified phases to form the relatively coarse pores within the fully fired tile body 1.

Figure 2:
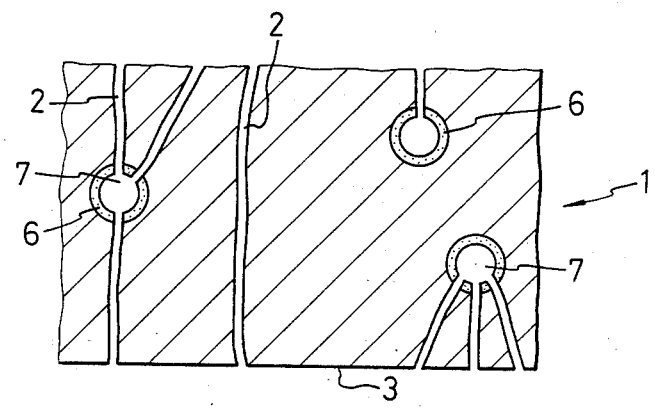
FIG. 2 is a schematic cross-sectional partial view of a fully-fired tile body wherein both the continuous micropores and the relatively coarse pores communicated therewith were formed, in accordance with the present invention.

When the raw stoneware material consists essentially of feldspar, raw talc and clay, the micropores 2 are formed in the bonded talc and clay, and the feldspar particles 5 are communicated with the micropores 2 in the intermediately-fired tile body 4, as illustrated in FIG. 1. In the subsequent firing, the feldspar particles 5 are fused into vitrified phases 6 to produce the relatively coarse pores 7 in the fully fired tile body 1, as illustrated in FIG. 2. Thus, the coarse pores 7 substantially corresponding to the particle sizes of the feldspar particles 5 are formed in the tile body 1, which are larger in diameter than the micropores 2. The relatively coarse pores 7 are communicated with the micropores 2, and the micropores are also communicated with the outsides 3 of the tile body 1. As a result, numerous numbers of the relatively coarse pores 7 and the continuous micropores 2 are incorporated in the fired tile body 1 and are communicated with the outsides of the tile body, in accordance with the present invention.

The reason why the freeze-thaw stability can be provided in the tile bodies of the present invention will be considered in the following with reference to FIG. 2. When the stoneware tile body 1 absorbs water, water can permeate the micropores 2 by capillarity but not the relatively coarse pores 7. That is because the diameter of the coarse pores 7 is as large as not to cause the capillarity as well as air present in the coarse pores 7 can not pass through the water-permeated micropores and remains within the coarse pores 7. Water present in the micropores 7 freezes and expands its volumes when the water-absorbed tile body 1 is subjected to freezing. The expanded volume of ice in the micropore 7 partly escapes from the continuous micropore to the outside of the tile body 1 or partly compresses the air remaining the coarse pore 7 connected with the micropore. As a result, the inner stress in the tile body 1 caused by the expansion is absorbed and/or moderated by the air present in the relatively coarse pores 7, and the conventional freeze-thaw damage of the tile body 1 is thus prevented.

The present invention is further explained by way of the following examples. The ratio and percentage are by weight.

EXAMPLE 1

Feldspar was ground in a ball mill to a mean particle size of about 10 microns, and the particles of about 1 micron or less in diameter were substantially removed. Raw talc was separately ground in a ball mill to a mean particle size of about 20 microns. The feldspar powder 30% and talc powder 63% were mixed uniformly in a ball mill together with water to prepare slip. Clay slip containing 7% clay prepared separately was added thereto and mixed uniformly therewith. The mixture was dried and ground to prepare the raw stoneware material. The resulting stoneware material was compressed at a pressing pressure of 300 kgf/cm$^2$ into tile-shaped molded articles 100 mm × 100 mm × 5 mm having a packing rate of 0.72.

Then, 76 pieces each of the molded articles were placed vertically in a firing vessel, heated in a tunnel kiln at 1040° C. for 48 hours, ordinary glaze was applied thereon, and 72 pieces each of the glazed tile bodies placed in a firing vessel were again heated in a tunnel kiln at 1125° C. for 36 hours. The resulting tile bodies had water absorption of 5%. The tile bodies were subjected to freeze-thaw testing consisting of freezing at −20° C. for 80 minutes and thawing in water at 30° C. for 20 minutes. Even after 1200 cycles of the testing, no change was observed. The above mentioned coefficient of water saturation was also measured. The coefficient of the resulting stoneware tile body was 0.4, which was also satisfactory with respect to freeze-thaw stability.

EXAMPLE 2

Sericite was ground in a ball mill to a mean particle size of about 8 microns. It was confirmed that the amount of the particles of less than about 1 micron in the ground sericite powder was not so large as to deteriorate the resulting stoneware bodies. Raw talc was separately ground in a ball mill to a mean particle size of about 20 microns. The sericite powder 48% and talc powder 42% were mixed uniformly in a ball mill together with water to prepare slip. Clay slip containing 4% bentonite and 6% other clay prepared separately was added thereto and mixed uniformly therewith. The mixture was dried and ground to prepare the raw stoneware material. The resulting stoneware material was compressed at 300 kgf/cm$^2$ into tile-shaped molded articles 100 mm×100 mm×5 mm having a packing rate of 0.71. The molded articles were dried at 80° C. for 10 minutes and glaze was applied thereon when they were hot.

The glazed articles were heated in a R.H. kiln at 1185° C. for one hour. The resulting tile bodies showed water absorption of 4%. The tile bodies were subjected to 1000 cycles of the freeze-thaw testing as described in Example 1, and no change was observed.

What is claimed is:

1. Freeze-thaw stable fired stoneware tile which includes, in its tile body having water absorption of about 0.5 to about 10%, a multiplicity of relatively coarse discontinuous pores having a pore diameter substantially in the range of about 0.6 to about 100 microns and exhibiting no substantial capillary action, and a multiplicity of continuous micropores having a pore diameter of not more than about 0.3 micron and exhibiting substantial capillary action, said relatively coarse pores being communicated with the continuous micropores, and said continuous micropores being communicated with the outside of the tile body.

2. The tile according to claim 1, in which the tile body has water absorption of about 1 to about 9%.

3. The tile according to claim 1, in which the pore diameter of the coarse pores is substantially in the range of about 1 to about 30 microns.

4. The tile according to claim 1, in which the pore diameter of the continuous micropores is substantially in the range of about 0.01 to about 0.3 micron.

5. The tile according to claim 4, in which the pore diameter of the micropores is substantially in the range of about 0.05 to about 0.2 micron.

6. The tile according to claim 1, in which the tile body also has a coefficient of water absorption of not more than about 0.7.

7. Freeze-thaw stable fired stoneware tile which includes, in its tile body having water absorption of about 0.5 to about 10%, a multiplicity of relatively coarse pores having no substantial capillary action and a multiplicity of continuous micropores having substantial capillary action, said relatively coarse pores being communicated with the outside of the tile body, which was produced by compressing a raw stoneware material consisting essentially of a plastic mineral material and a mineral flux material having a mean particle size of not less than about 1 micron into a molded article having a mean packing rate of not less than 0.68, and then baking the molded article to a temperature at which the flux material included in the molded article fuses.

8. A process for production of freeze-thaw stable stoneware tile including, in its tile body having water absorption of about 0.5 to about 10%, a multiplicity of relatively coarse pores having no substantial capillary action and a multiplicity of continuous micropores having substantial capillary action, said relatively coarse pores being communicated with the continuous micropores, and said continuous micropores being communicated with the outside of the tile body, which process comprises the step of compressing a raw stoneware material consisting essentially of a plastic mineral material and a mineral flux material having a mean particle size of not less than about 1 micron into a molded article having a mean packing rate of not less than 0.68, and then baking the molded article to a temperature at which the flux material included in the molded article fuses; whereby the continuous micropores are formed and the raw stoneware material is bonded together, and then the flux material is fused to form the relatively coarse pores communicated with the micropores.

9. The process according to claim 8, in which the ratio by weight of the plastic mineral material to the mineral flux material is substantially in the range of about 25/75 to about 95/5.

10. The process according to claim 8, in which the mineral flux material has a mean particle size of about 1 to about 80 microns.

11. The process according to claim 8, in which the plastic mineral material has a mean particle size of about 0.3 to about 80 microns.

12. The process according to claim 8, in which the molded article is baked at a stoneware-forming temperature and then at a temperature at which the flux material fuses.

13. The process according to claim 8, in which a plurality of the molded articles are placed vertically in firing vessels and baked.

14. The process according to claim 8, in which the particle size of the mineral flux material is substantially in the range of about 1 to about 80 microns.

15. The process according to claim 14, in which the mineral flux material is separately ground and classified to substantially remove the particles outside of the range of about 1 to about 80 microns.

16. The process according to claim 8, in which the mineral flux material comprises feldspar, sericite, lime, limestone and/or petalite.

17. The process according to claim 8, in which the plastic mineral material comprises talc, steatite, pottery stone and/or clay.

18. The process according to claim 8, in which the pore diameter of the relatively coarse pores is substantially not less than about 0.6 microns and the pore diameter of the continuous micropores is substantially not more than about 0.3 micron.

19. The tile according to claim 1 formed of a compressed mixture consisting essentially of (1) a plastic raw stoneware mineral material selected from the group consisting of talc, steatite, pottery stone, clay and mixtures thereof, and (2) a mineral flux material having a mean particle size of not less than about 1 micron and selected from the group consisting of feldspar, cericite, lime, limestone, petalite and mixtures thereof; the ratio by weight of the plastic mineral to the flux material being about 25/75 to about 95/5, the flux material having fused to provide said coarse pores; said tile having coefficient of water saturation of not more than about 0.7.

* * * * *